Feb. 25, 1964    E. R. QUIRAM    3,122,632
DETERMINATION OF SULFUR IN A GAS STREAM BY MEANS OF
A RADIOACTIVE SOURCE AND DETECTOR
Filed Nov. 17, 1958
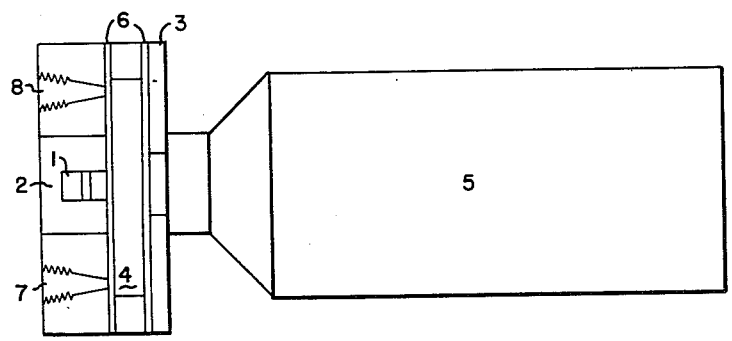
Ernest R. Quiram    Inventor
Small, Thomas, Dunham & Marx
By  *Seymour Stahl*
Patent Attorney

United States Patent Office

3,122,632
Patented Feb. 25, 1964

3,122,632
DETERMINATION OF SULFUR IN A GAS STREAM BY MEANS OF A RADIOACTIVE SOURCE AND DETECTOR
Ernest R. Quiram, Elizabeth, N.J., assignor to Esso Research and Engineering Company, a corporation of Delaware
Filed Nov. 17, 1958, Ser. No. 774,136
6 Claims. (Cl. 250—43.5)

This invention relates to quantitative radiation analysis of gases and more particularly to a method for continuously determining the concentration of sulfur in a gas stream by means of X-ray radiation absorption.

In any desulfurization process one of the most important problems facing the refiner is to find ways and means of disposing or making economical utilization of the sulfur gases formed during the process. To a large extent these sulfur gases are mostly hydrogen sulfide and sulfur dioxide. With the advent of present refinery techniques, such as hydrosulfurization, and the current trend for using high sulfur crude oils, it is anticipated that the production of by-product hydrogen sulfide will steadily increase. Such gases being both noxious and poisonous, stringent controls are imposed by the refiner to prevent their escape into the atmosphere. Besides having commercial value, however, sulfur gases are particularly useful, for example, for the preparation of the sulfuric acid. It is for this purpose that by-product hydrogen sulfide is mainly used in today's refining operations.

From an economical point of view the refiner cannot always justify maintaining his own sulfur recovery unit, and it is to his advantage to sell and send the sulfur-containing gas via pipeline to commercial sulfur recovery plants. Obviously such an arrangement requires strict chemical control particularly from the point of view of obtaining satisfactory information for inventory purposes. Heretofore, however, no method has been developed which can simultaneously detect daily fluctuations in the sulfur level of a gas stream at high level concentrations and at the same time furnish a continuous permanent record of the amount of sulfurous compound supplied to a sulfur recovery unit. The present invention provides such a method wherein gas streams containing sulfur or sulfur compounds can be analyzed continuously to give better and more reliable information than can be obtained through batch sampling techniques. By this novel method the problem of sampling non-representative samples is eliminated. Further, essentially no supervision on the part of the operator is required and better control of plant operations can be maintained at low cost.

Briefly the present invention provides a method of continuously determining the sulfur concentration in a stream of gas by irradiating the gaseous stream or a portion thereof with substantially monochromatic X-ray radiation and recording the transmittance of radiation through this stream.

Specifically, the method of continuously determining the amount of gaseous sulfur in a plant stream or in other refinery operations comprises forming an irradiation zone disposed between a radioactive iron-55 source and a radiation detector, measuring radiation activity, for example, in counts per minute, to determine the radiation transmittance through a stream of pure gaseous sulfur compound passed through the irradiation zone, measuring the radiation transmittance through a stream of base gas from which all the sulfur compound has been removed, plotting graphically the concentration of sulfur compound against the measured activity at sulfur compound levels between 0 and 100%, then directing a stream of gas containing an unknown amount of sulfur through the zone and measuring continuously the absorption of radiation by sulfur present in the gas. Temperature effects are negligible in the range of 0° to 100° F. though generally calibrations and sulfur determinations will be made at the same temperature.

Broadly, any sulfur-containing gas stream can be analyzed in accordance with the present method. Usually the base gaseous material will be air, carbon dioxide, or a petroleum gas, such as methane, ethane, propane, butanes, or petroleum light ends, such as a mixture of propane and butanes, and the like, or mixtures of any of these. Sulfur compounds, the concentration of which can be determined in accordance with the present invention, are gaseous compounds such as sulfur dioxide, sulfur trioxide, hydrogen sulfide, and the like. Concentrations of such gaseous sulfur compounds can be determined at levels in the range of from 0 to 100% in accordance with this invention. A particular advantage of this process is that sulfur gas concentrations at high levels in the range of 50 to 90% can be determined.

The present method of analysis using radioactive iron-55 offers a surprisingly simple and convenient solution to the problem of finding a method for determining continuously the concentration of sulfur in transported gas streams. In accordance with this invention the radioactive source contains radioactive material consisting essentially of iron-55. This isotope is ideally and uniquely suited for the process. Not only does this isotope yield X-radiation in substantial quantities over a substantial life period but it emits mono-chromatic X-ray radiation having a wavelength of approximately 2.06 A. which is particularly effective for sulfur analyses. Furthermore, the iron-55 is a solid and can easily be mounted in commercial apparatus fabricated in accordance with this invention. By using mono-chromatic Fe-55 radiation other elements which may be present in a gas stream do not present interference problems.

Naturally occurring iron can be bombarded with neutrons in a radiation pile to produce radioactive iron isotopes and after an aging period of about two to six months the radioactivity of the iron-59 isotope will be substantially eliminated from the iron object which was bombarded. On the other hand, iron-55 having a half-life of 2.91 years will still have almost all the original amount of radiation activity. This isotope decays by K capture giving an X-ray of 6 k.e.v. (thousand electron volts) to produce manganese-55 as the ultimate product of decay.

Iron-55 is presently available with specific activities equal to about 12 millicuries per gram and higher. After aging for six months the radiation from the iron-59 isotope will be substantially eliminated while the radioactivity of the iron-55 has been reduced to only a very small amount. While the particular strength of the source is not critical to the process discovered, it is preferable from the analytical standpoint to utilize a radioactive source having active material consisting essentially of iron-55. Source strengths in the range of 1 to 1000 millicuries are most advantageously employed.

The method of the present invention utilizes the soft X-rays of iron-55 by absorption. Low energy X-rays emitted from the radioactive source are absorbed by any sulfur present in the gas stream. Thus, the extent to which X-rays are absorbed is a function of the amount of sulfur. Transmittance is measured with a suitable radiation detector, such as Geiger-Mueller tube, which is sensitive to soft X-rays. The output of the Geiger tube is fed to a conventional scaler or ratemeter and from the information obtained the sulfur concentration can readily be determined. The method of the invention is particularly advantageously employed for continuously determining the sulfur content in a plant stream or in a stream of gas being transported by pipeline to a sulfur recovery plant. It comprises directing at least a portion of this gas stream through an irradiation zone disposed between the radioactive iron-55 source and a radiation detector and measuring the absorption of X-rays emitted from the iron-55 by sulfur present in the gas, whereby the quantity of sulfur-bearing gas being shipped is measured and recorded.

The novel features which are believed to be characteristic of the invention both as to its organization and method of operation will be understood more clearly and fully from the description below considered in connection with the following examples.

EXAMPLE I

The equipment used in this sulfur determination consisted of three main parts: (1) the radioactive source; (2) detecting instruments; and (3) a sample cell through which was passed a gas stream containing sulfur. A cross-sectional view of the equipment employed is shown in the attached drawing.

The radioactive source 1 consisted of four millicuries of iron-55 enclosed in a brass source holder 2. This source holder was fastened to a mounting plate 3 which also held the sample cell 4 and a sliding mechanism for positioning the Geiger tube at various distances from the source. The detector employed in Example 1 was a standard commercial Geiger tube 5 (Tracerlab TGC–3NA) connected to a suitable scaler (Tracerlab SC–19) and internal timer.

A simple gas cell constructed from stainless steel tubing approximately 2 inches long and 1 inch in diameter having plastic windows 6 sealed at both ends was employed. Suitable plastic materials are vinyl or polystyrene each having high resistance to acids. Alternately, material of low atomic number such as beryllium or aluminum can be used for thin windows. Small pieces of stainless steel tubing were threaded near each end of the gas cell and were used as an inlet 7 and outlet 8 for the flow of gas.

Sulfur gases and base gases (sulfur free) were fed through two calibrated rotameters into a mixing bottle containing glass beads. The mixed gases were then fed to the gas cell and vented to the atmosphere. By adjusting the flow of gases, blends of any desired concentration could be obtained. The Geiger tube and scaler were employed as detecting instruments with an internal timer accurate to 0.1 second which shut off the scaling circuit when a preset number of counts had been reached.

The effectiveness of the method is illustrated by Table I, showing a decrease in count rate from 30,000 c.p.m. to about 6,000 c.p.m. for an increase in concentration of hydrogen sulfide in air in the range of from 0 to 100%.

Table I

EFFECT OF H₂S CONCENTRATION ON COUNT RATE

| Percent $H_2S$: | Counts per minute |
|---|---|
| 0 | 30,000 |
| 30.0 | 18,000 |
| 50.0 | 14,000 |
| 64.0 | 10,000 |
| 80.0 | 8,000 |

That good recovery was achieved can be seen from the data of Table II which indicate that an absolute error of only ±2% can be obtained at hydrogen sulfide concentration levels in the range of from 0 to 100% for synthetic blends of hydrogen sulfide and air.

Table II

DETERMINATION OF H₂S WITH IRON-55 USING SCALER

| Percent $H_2S$ Added | Percent $H_2S$ Found |
|---|---|
| 0 | 0 |
| 28 | 30 |
| 50 | 48 |
| 80 | 81 |
| 100 | 99 |

EXAMPLE II

The sulfur content of a stream of gas was continuously determined in the manner of Example I by means of continuous recording apparatus in a modification of the method of Example I. A precision ratemeter is particularly suitable for precision monitoring work, in accordance with this invention, its main advantage over the scaler being that it can be connected to a recorder as a plant instrument to furnish a permanent continuous record of the activity shown by counting rate. The ratemeter employed in this example was capable of accepting counting rates up to 25,000 c.p.m. By means of a conventional sliding mechanism the Geiger tube can be placed in position at a convenient fixed distance from a source such that the counting rates for all concentrations of sulfur from 0 to 100% will fall on the instrument scale. Results obtained from evaluation of the continuous recording instrument with synthetic hydrogen sulfide-air blends are shown in Table III.

Table III

DETERMINATION OF H₂S WITH IRON-55 USING RECORDER

| Percent $H_2S$ Added | Percent $H_2S$ Found |
|---|---|
| 0 | 0 |
| 16 | 18 |
| 38 | 38 |
| 50 | 50 |
| 62 | 64 |
| 84 | 87 |
| 100 | 100 |

Calibration curves for various sulfur-free base gases such as carbon dioxide, air, petroleum gases such as methane, ethane, butane, light ends, and the like were derived simply by measuring the absorptivities expressed as dial readings of the instrument and plotting these against concentration of sulfur. The calibration curve is prepared from an unknown gas, by first removing sulfur, for example, by passing the sample stream through an acidified cadmium chloride (100 ml. 1 normal cadmium chloride acidified with 2 ml. concentrated hydrochloric acid) to remove the hydrogen sulfide. The sulfide free gas is then fed to the sample cell and a zero point obtained by recording the degree of absorption. The 100% point of the calibration curve is determined simply by measuring the absorption by pure hydrogen sulfide.

The above examples clearly show that the sulfur concentration in a stream of gas can be continuously determined over a range of values from 0 to 100% concentration by irradiating these streams with X-rays from an iron-55 source and recording the transmittance of radiation through the stream. The surprising feature of the present invention is well illustrated by the above examples; namely, that the concentration of sulfur in a gas stream logarithmically plotted against count rate in a straight line over a range of sulfur concentration from 0 to 100%.

It is to be understood that the above-described arrangements and techniques are but illustrative of the application of the principles of the invention. Numerous other arrangements and procedures may be devised by those skilled in the art without departing from the spirit and scope of the invention.

1. A method of continuously determining the amount of hydrogen sulfide in a stream of refinery gas which comprises forming an irradiation zone disposed between a radioactive iron-55 source and a radiation detector, measuring activity by the radiation transmittance through a stream of pure hydrogen sulfide passed through said irradiation zone, measuring the radiation transmittance through a stream of said refinery gas from which all hydrogen sulfide has been removed, plotting graphically the concentration of hydrogen sulfide against radiation activity at hydrogen sulfide levels between 0 and 100%, then directing a stream of refinery gas containing an unknown amount of hydrogen sulfide through said zone and measuring continuously the absorption of radiation by the sulfur present in said gas, and determining the concentration of hydrogen sulfide in said last stream by comparing the absorption of radiation by the sulfur in said last stream with the absorption of radiation of the first two said streams.

2. A method of continuously determining the gasiform sulfur content of a stream of gas being transported by pipeline which comprises directing at least a portion of said stream through an irradiation zone disposed between a radioactive iron-55 source and a radiation detector and measuring the absorption of X-rays emitted from said iron-55 by the sulfur present in said gas, said absorption being proportional to the concentration of sulfur in said gas.

3. A method of continuously determining the amount of gasiform sulfur in a sulfur-containing base gas stream which comprises forming an irradiation zone disposed between a radioactive iron-55 source and a radiation detector, passing a first gas stream consisting of said gasiform sulfur through said zone and measuring the radiation transmittance of said first stream, passing a second stream consisting of said base gas stream from which all of said gasiform sulfur has been removed through said zone and measuring the radiation transmittance of said second stream and thereafter passing a third stream consisting of said base gas containing an unknown amount of said gasiform sulfur through said zone and measuring the radiation transmittance of said third stream and determining the amount of said gasiform sulfur in said third stream by comparing the radiation transmittance of said third stream with the radiation transmittance of said first and second streams.

4. A process according to claim 3 in which said gasiform sulfur is selected from the group consisting of sulfur dioxide, sulfur trioxide and hydrogen sulfide.

5. A process according to claim 3 in which said base gas stream is selected from the group consisting of air, carbon dioxide, $C_1$ to $C_4$ hydrocarbons, and mixtures thereof.

6. A process according to claim 3 in which said gasiform sulfur comprises from 50 to 90 volume percent of said base gas stream.

References Cited in the file of this patent
UNITED STATES PATENTS

| | | |
|---|---|---|
| 2,706,789 | Hughes | Apr. 19, 1955 |
| 2,784,319 | Flook et al. | Mar. 5, 1957 |
| 2,847,578 | Staten | Aug. 12, 1958 |
| 2,883,542 | Jacobs | Apr. 21, 1959 |